United States Patent [19]
Doke et al.

[11] Patent Number: 5,406,253
[45] Date of Patent: Apr. 11, 1995

[54] DIRECTION-INDICATING DEVICE FOR A VEHICLE

[75] Inventors: Harumi Doke; Takashi Suzuki, both of Aichi, Japan

[73] Assignee: Kabushiki Kaisha Tokai-Rika-Denki-Seisakusho, Niwa, Japan

[21] Appl. No.: 51,549

[22] Filed: Apr. 26, 1993

[30] Foreign Application Priority Data

Apr. 30, 1992 [JP] Japan ................................. 4-111318
Jun. 16, 1992 [JP] Japan ................................. 4-156449

[51] Int. Cl.⁶ ............................................. B60Q 1/34
[52] U.S. Cl. ................................. 340/475; 340/476; 200/61.3; 200/61.31; 200/61.35; 200/61.27
[58] Field of Search ............ 340/476; 200/61.3, 61.31, 200/61.32, 61.33, 61.34, 61.35, 61.27

[56] References Cited

U.S. PATENT DOCUMENTS

| | | | |
|---|---|---|---|
| 3,852,543 | 12/1974 | Suzuki | 200/61.3 |
| 4,123,632 | 10/1978 | Muto | 200/61.27 |
| 4,351,991 | 9/1982 | Morita et al. | 200/61.27 |
| 4,859,816 | 8/1989 | Tanaka | 200/61.27 |

FOREIGN PATENT DOCUMENTS 3507921  10/1986  Germany .

*Primary Examiner*—John K. Peng
*Assistant Examiner*—Daryl C. Pope
*Attorney, Agent, or Firm*—Oliff & Berridge

[57] ABSTRACT

A direction-indicating device for use in a vehicle, in which at least one of engaging Portions at both end portions of a ratchet includes: a first surface, which is shoved by a cam-protruding portion located on a canceling cam, when a bracket remains pivoted to either a counterclockwise position or a clockwise position, and further the canceling cam is turned in the same direction as the bracket; a second surface, against which the cam-protruding portion scrapes when the cam-protruding portion is driven into further movement in the orientation of the bracket after passing over the first surface upon movement of the ratchet due to thrusting of the cam-protruding portion at the first surface; and, a third surface, with which the cam-protruding portion is moved into engagement when the bracket remains pivoted to either the counterclockwise position or the clockwise position while the canceling cam is turned in a direction opposite to that of the bracket, the bracket being pivoted to the neutral position because of engagement between the cam-protruding portion and the third surface. Each of the first surface through the third surface forms a different angle with a reference line which extends between a central point of the canceling cam and the neutral position of said detent mechanism.

20 Claims, 6 Drawing Sheets

| L | (GREATER) ⇔ (SMALLER) |
|---|---|
| OVER-CANCEL | (WORSE) ⇔ (BETTER) |

| RAKE ANGLE(α) | SMALLER ←————————→ LARGER |
|---|---|
| OVER-CANCEL | (WORSE) ————————→ (BETTER) |
| CANCEL MISOPERATION | (BETTER) ←———————— (WORSE) |
| SEMI-CANCEL MISOPERATION | (BETTER) ←→ (WORSE) ←→ (BETTER) |
| LEVER VIBRATION | (SMALLER) (GREATER) ←→ (BETTER) |
| RATCHET-CLICKING SOUND | (HIGHER) ————————→ (LOWER) |

DIRECTION-INDICATING DEVICE FOR A VEHICLE

BACKGROUND OF THE INVENTION

1. Field of the Invention

The present invention relates to a direction-indicating device for a vehicle, which is provided with a self-canceling function.

2. Description of the Related Art

FIG. 10 illustrates a conventional structure of a direction-indicating device for use in a vehicle, for example, an automobile. Note that the upper, lower, left, and right sides in all of the accompanying drawings respectively represent: the upper direction of the device; the lower direction thereof; the left side thereof; and, the right side of the same. In this conventional device, a base 1 is provided with a canceling cam 2 and a bracket 3. The canceling cam 2 rotates together with an unillustrated steering wheel. The bracket 3 has a frame-like shape that surrounds the canceling cam 2. The bracket 3 is disposed on the base 1 so as to be pivotable about a shaft 3a. A turn lever 4 is mounted at the right side of the bracket 3. A detent mechanism 5 is positioned at the left side of the bracket 3. The detent mechanism 5 permits the bracket 3 to be selectively retained at a neutral position, a counterclockwise position, and a clockwise position.

The ratchet 6 is urged toward the right side in FIG. 10. Engaging portions 7 and 8 are formed at both end portions of the ratchet 6 in the upper and lower directions thereof. The engaging portions 7 and 8 are respectively formed with thrust surfaces 7a and 8a and engaging surfaces 7b and 8b.

When the turn lever 4 is pivoted to the counterclockwise position shown in FIG. 11 from a state shown in FIG. 10 in which the bracket 3 is held in a neutral position, the bracket 3 turns together with the pivotal movement of the turn lever 4. As illustrated in FIG. 12, the engaging portion 7 at one end portion of the ratchet 6 is thereby positioned within the trajectory of movement of the cam-protruding portions 2a which are provided on the canceling cam 2.

In the above state, the canceling cam 2 is forced into counterclockwise movement (in the direction of arrow A) in the same orientation of the turn lever 4. The thrust surface 7a is then shoved by the cam-protruding pot-%ion 2a. At the same time, the ratchet 6 is retracted in the direction of arrow B, which allows the rotational movement of the canceling cam 2. On the other hand, when the canceling cam 2 is driven into clockwise movement (in the direction of arrow C) opposite the orientation of the turn lever 4, the cam-protruding portion 2a is forced into engagement with the engaging surface 7b which is then pushed. The bracket 3 is thereby sprung back canceled to the neutral position together with the turn lever 4.

Although no illustrations are provided, when the bracket 3 is pivoted toward the clockwise position, the engaging portion 8 at the other end portion of the ratchet 6 is positioned within a trajectory in which the other of the cam-protruding portions 2a rotates. In this state, the canceling cam 2 is forced into clockwise movement in the same direction as the orientation of the turn lever 4. The thrust surface 8a is then shoved by the cam-protruding portion 2a. At the same time, the ratchet 6 assumes a retracted position, which allows movement of the canceling cam 2. On the other hand, when the canceling cam 2 is driven into counterclockwise movement opposite the orientation of the turn lever 4, the protruding portion 2a is forced into engagement with the engaging surface 8b which is then pushed away. The bracket 3 is thereby sprung back to the neutral position together with the turn lever 4.

According to the conventional structure shown in FIG. 10 through FIG. 12, particular consideration has been given to the weight of the turn lever 4 in order to increase the efficiency of canceling. Accordingly, as illustrated in FIG. 10, the engaging surfaces 7b and 8b assume non-symmetric shapes relative to parallel lines 0' which run with a reference line 0. (The reference line 0 extends between the central point of the canceling, cam 2 and a neutral position of the sinuous wall 5a in the detent mechanism 5.) As a result, each of the engaging surfaces 7b and 8b forms a different angle (hereinafter referred to as a rake angle $\alpha$) with each of the parallel lines 0'.

In order to provide high-performance canceling, the above-described device must minimize the occurrence of canceling performance-related factors that follow:

(For clarity of description, the same reference characters as those in FIG. 10 through FIG. 12 are given below.)

1) Over-cancel: assuming that the bracket 3 remains in one of the clockwise and counterclockwise positions, rotation of the canceling cam 2 in a canceling direction (i.e., opposite to the orientation of the bracket 3) causes the bracket 3 to move over the neutral position to the other of the clockwise and counterclockwise positions;

2) Cancel misoperation: assuming that the bracket 3 remains in one of the clockwise and counterclockwise positions, rotation of the canceling cam 2 in the aforesaid canceling direction intercepts the bracket 3 from being sprung back to the neutral position;

3) Semi-cancel misoperation: assuming that the bracket 3 remains in one of the clockwise and counterclockwise positions, movement of the canceling cam 2 in the same direction as the orientation of the bracket 3 causes one of the cam-protruding portions 2a to pass over the thrust surface 7a (or 8a) and scrape against the engaging surface 7b (or 8b). This scraping movement generates pivotal force which urges the bracket 3 back to the neutral position. As a result, the bracket 3 is prematurely sprung back thereto;

4) Turn lever vibration: assuming that the bracket 3 remains in one of the clockwise and counterclockwise positions, movement of the canceling cam 2 in the same direction as the orientation of the bracket 3 causes one of the cam-protruding portions 2a to travel over the thrust surface 7a (or 8a) and scrape against the engaging surface 7b (or 8b). This scraping movement generates pivotal force which urges the bracket 3 back to the neutral position. The turn lever 4 is thereby momentarily brought into vibratory motion; and, 5) A ratchet-clicking sound: assuming that the bracket 3 remains in one of the clockwise and counterclockwise positions, movement of the canceling cam 2 in the same direction as the orientation of the bracket 3 causes one of the cam-protruding portions 2a to pass over the thrust surface 7a (or 8a). The ratchet 6 is thereby pushed into a retracted position at first, but is immediately thereafter sprung back to the original position by the urging force. At this time, the ratchet 6 impinges on corresponding one of the supporting portions 3b of the bracket 3, thereby emitting the sound.

These factors are associated with various ingredients other than the aforesaid rake angle α (for example, rotating speeds of the canceling cam 2 as well as a steering wheel, weights of the bracket 3 and the turn lever 4, the frictional forces of the bracket 3 and ratchet 6, or the holding force of the detent mechanism 5). The rake angle a among them is an ingredient of particular importance.

FIG. 9 illustrates a correlation between the rake angle a and the above-described canceling performance-related factors.

As a tendency of each of the factors is indicated therein, a possibility of over-cancel decreases with a larger degree of the rake angle α (i.e., a better state), while increasing with a smaller degree thereof (i.e., worse state).

In contrast, the possibility of cancel misoperation lessens with a smaller degree of the rake angle α (better state), while increasing with a larger degree thereof (worse state).

The likelihood of the semi-cancel misoperation increases within a limited range (worse state), or otherwise semi-cancel misoperation does not occur easily (better state).

Similar to the above, an amount of lever vibration increases within a limited range (greater amount), or otherwise either the amount of the lever vibration decreases (smaller amount) or the likelihood of the lever vibration lessens (better state).

The ratchet-clicking sound is lowered with a greater degree of rake angle α (lower sound), while increasing with a smaller degree thereof (higher sound).

As can be seen from the above, there is a close relationship between the rake angle α and canceling performance factors. A problem therewith is that an optimum setting for the rake angle α has a limit in optimization of all of the aforesaid factors. As a result, requirements from users cannot be satisfied completely.

SUMMARY OF THE INVENTION

An object of the present invention is to provide a direction-indicating device for use in a vehicle, which can achieve higher performance canceling, and can thus fulfill requirements from users completely, A first aspect of the present invention provides a direction-indicating device, comprising: a base; a canceling cam, which rotates together with a steering wheel, the canceling cam having a cam-protruding portion defined on an outer-circumferential portion thereof; a bracket, which is pivotably located on the base so as to surround at least a portion of the canceling cam; a turn lever, which is located at one side of the bracket around the canceling cam in order to pivot the bracket between a counterclockwise position, a clockwise position, and a neutral position; a ratchet, which is positioned at the other side of the bracket around the canceling cam so as to be supported by the bracket at both end portions of the ratchet, the ratchet having engaging portions defined adjacent to both of the end portions of the ratchet so as to move together with pivotal movement of the bracket toward one of the clockwise and counterclockwise positions, one of the engaging portions being driven within a path of movement of the cam-protruding portion in response to positioning of the bracket; and, a detent mechanism, which is mounted to both of the bracket and the base at a substantially intermediate portion of the ratchet so as to permit the bracket to be selectively held between the clockwise and counterclockwise positions and the neutral position, the ratchet is urged in a direction at which the turn lever is positioned, wherein at least one of the engaging portions defined on the ratchet further includes: a first surface, which is shoved by the cam-protruding portion when the bracket remains pivoted to one of the clockwise and counterclockwise positions, and further the canceling cam is turned in the same direction as the bracket; a second surface, against which the cam-protruding portion scrapes when the cam-protruding portion is further moved in the orientation of the bracket after passing over the first surface upon movement of the ratchet due to thrusting of the cam-protruding portion at the first surface; a third surface, with which the cam-protruding portion is moved into engagement when the bracket remains pivoted to one of the clockwise and counterclockwise positions while the canceling cam is turned in a direction opposite to the orientation of the bracket, the bracket being pivoted to the neutral position because of engagement between the cam-protruding portion and the third surface. Furthermore, each of the first surface through the third, surface forms a different angle with a reference line which extends between a central point of the canceling cam and the neutral position of the detent mechanism.

In the above structure according to the first aspect of the present invention, when the bracket remains pivoted to either the counterclockwise position or the clockwise position, the cam-protruding portion is engaged with the engaging portion of the ratchet at a different location, depending on whether the canceling cam is moved in the same direction as the orientation of the bracket or in a canceling direction opposite to the same orientation. To be specific, when the canceling cam is rotated in the same direction as the orientation of the bracket (i.e., the canceling cam assumes a non-canceling mode), the cam-protruding portion first impinges on the first surface of the engaging portion. The ratchet is thereby shoved, and assumes an out-of-line position. After the cam-protruding portion travels over the first surface, the ratchet is sprung back toward the canceling cam. At the same time, the cam-protruding portion thereby scrapes against the second surface. Thereafter, the cam-protruding portion is disengaged from the engaging portion.

On the other hand, when the canceling cam is turned in a direction opposite to that of the bracket (i.e., the canceling cam assumes a canceling mode), the cam-protruding portion is forced into engagement with the third surface of the engaging portion. This engagement generates a pivotal force which urges the bracket back to the neutral position via the ratchet. The cam-protruding portion is dislodged from the engaging portion after permitting the ratchet and the bracket to be returned to the neutral position.

The third surface, with which the cam-protruding portion is in engagement in the canceling mode, is particularly associated with over-cancel and cancel misoperation among canceling performance-related factors. In addition, the second surface, against which the cam-protruding portion scrapes in the non-canceling mode, is particularly related to semi-cancel misoperation, lever vibration, and a ratchet-clicking sound among the same factors.

Accordingly, a linear surface portion of a conventional engaging portion is divided into two sections, that is, a second surface and a third surface. In addition, each of the second surface and the third surface appropriately forms an angle (i.e., a rake angle $\alpha$) relative to a reference line. As a consequence, compared with the prior art, the canceling performance-related factors can be further well-balanced so as to achieve optimization of the same factors.

Moreover, at least one of the engaging portions defined on the ratchet includes: a first surface, which is shoved by the cam-protruding portion in the non-canceling mode; a second surface, against which the cam-protruding portion scrapes after passing over the first surface; and, a third surface, with which the cam-protruding portion is in engagement in the canceling mode. Furthermore, each of the first surface through the third surface has a different angle with the reference line. As a result, the above-described structure provides improved benefits which can offer a higher level of canceling performance, and can thus satisfy requirements from users completely.

According to a second aspect of the present invention, each engaging portion includes a first surface through a third surface, of which the second and third surfaces are formed into an arcuate surface portion. The arcuate surface portion extends outwardly toward a canceling cam.

In the above structure according to the second aspect, the second and third surfaces of the engaging portion are formed into the arcuate surface portion which protrudes therefrom toward the canceling cam. This configuration provides a similarity to the first aspect, in which each of the second and third surfaces has a different angle defined relative to the reference line. As a consequence, operation and benefits similar to the first aspect are achievable.

DESCRIPTION OF THE PREFERRED EMBODIMENT

Figure 11:
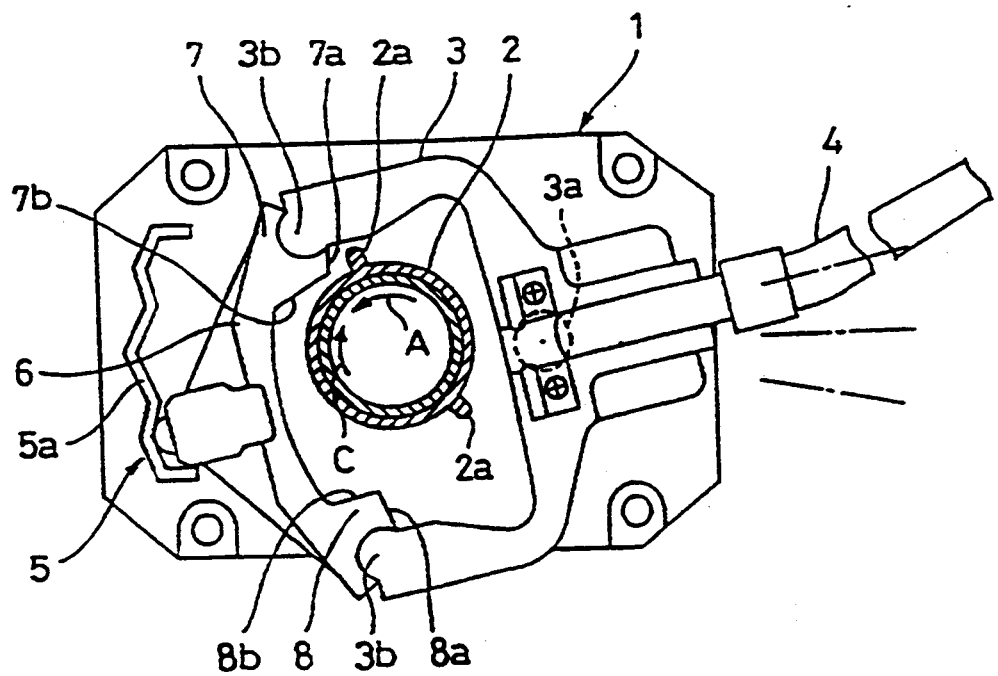
FIG. 11 is a plan view, showing the conventional device in which the bracket assumes a counterclockwise position; and, FIG. 12 is an enlarged plan view, showing a main portion of the conventional device in order to describe operation thereof.
Figure 12:
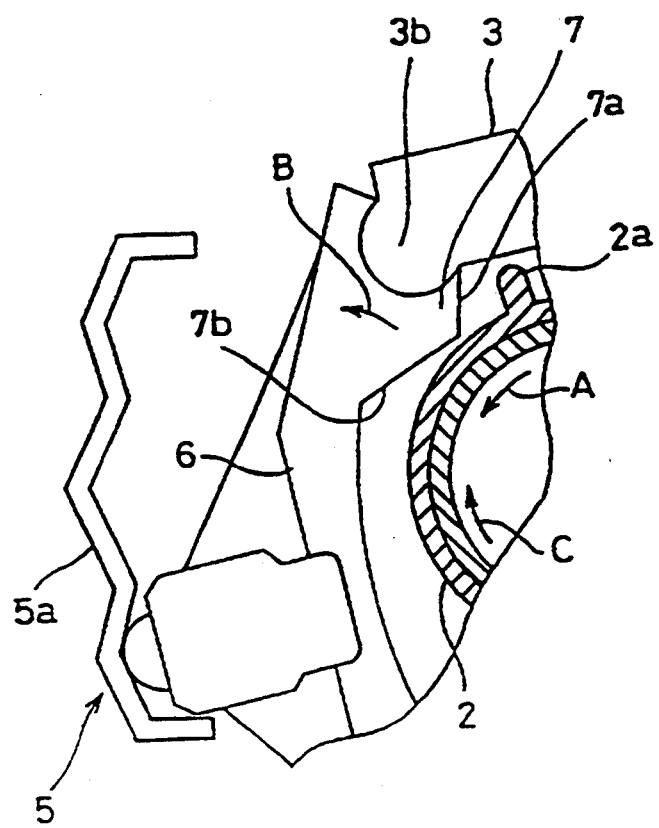

A first embodiment of the present invention will now be described with reference to FIG. 1 through FIG. 7 and FIG. 9. Note that the basic structure according to the present embodiment is similar to a conventional one shown FIG. 10 through FIG. 12, except for a ratchet.

Figure 2:
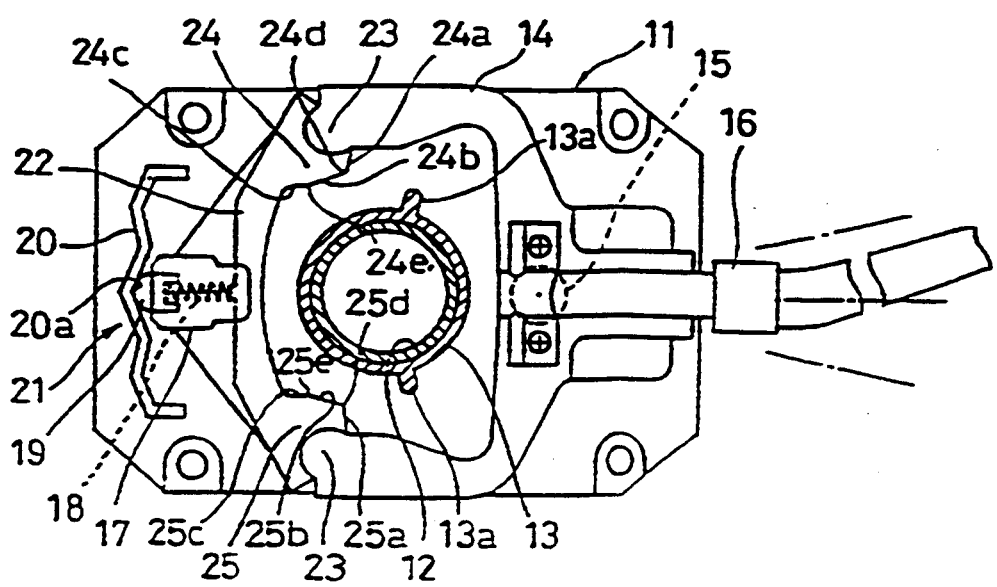
FIG. 2 is a plan view, illustrating the device according to the first embodiment in which a bracket is held in a neutral position.

Referring now to FIG. 2, a synthetic resin-made base 11 is formed with a cylindrical portion 12 at a central portion thereof in order to permit a steering shaft (not shown) to extend through the cylindrical portion 12. A canceling cam 13 is rotatably held in engagement with the cylindrical portion 12 around the outer-circumference thereof. The canceling cam 13 has cam-protruding portions 13a defined on an outer-circumferential portion thereof. The canceling cam 13 is fitted to the cylindrical portion 12 so as to rotate in union with an unillustrated steering wheel which in turn is mounted to the steering shaft.

A bracket 14 is also formed of a synthetic resin, and forms a frame-like shape that surrounds the canceling cam 13. The bracket 14 is disposed on the base 11 so as to pivot about a shaft 15 which is located on the right side of the canceling cam 13. A turn lever 16 is positioned to the right of the bracket 14. A synthetic resin-made ratchet 22 is movably supported at both end portions thereof by a pair of supporting portions 23 of the bracket 14. An accommodating portion 17 is mounted to the bracket 14 at a central portion of the ratchet 22. The accommodating portion 17 accommodates a helical compression spring 18 and a sinuous wall-abutting piece 19. Serving as an urging means, the helical compression spring 18 urges the sinuous wall-abutting piece 19 toward a sinuous wall 20 which is formed on the base 11. A distal end portion of the sinuous wall-abutting piece 19 is thereby forced against the sinuous wall 20. Consequently, the central portion of the ratchet 22 is urged back toward the canceling cam 13. As such, the ratchet 22 is in engagement with bracket 14. The ratchet 22 has engaging portions 24 and 25 integrally formed at both end portions thereof. The engaging portions 24 and 25 project toward the canceling cam 13.

The helical compression spring 18, the sinuous wall-abutting piece 19, and the sinuous wall 20 form a detent mechanism 21. The detent mechanism 21 selectively holds the-turn lever 16 as well as the bracket 14 between a neutral position, a counterclockwise position, and a clockwise position.

Figure 1:
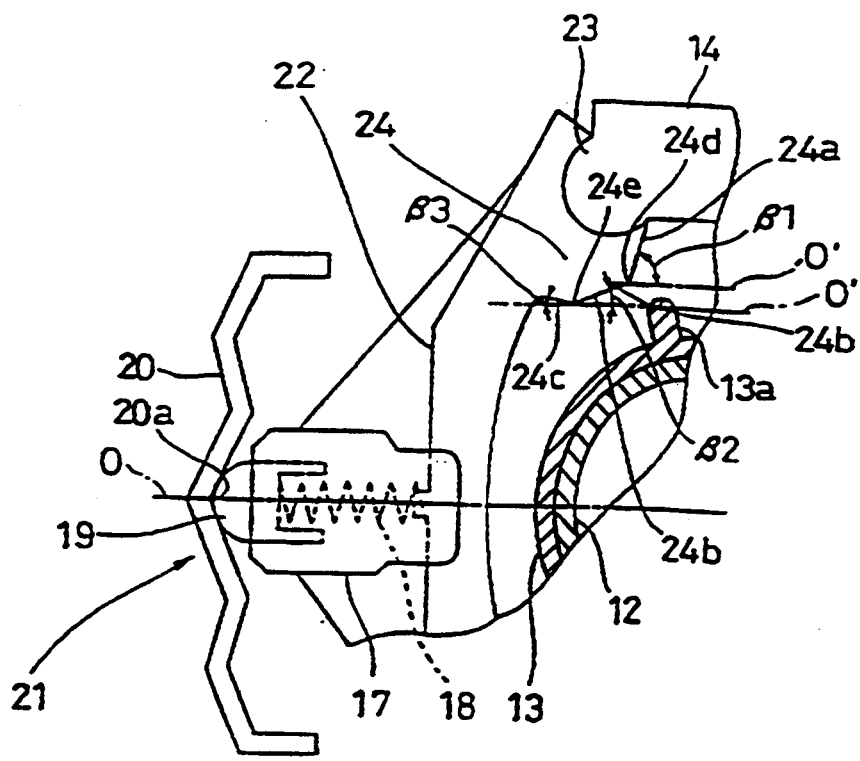
FIG. 1 is an enlarged plan view, illustrating a main portion of a direction-indicating device according to a first embodiment of the present invention.

Next, FIG. 1 illustrates the engaging portion 24 which is located at an upper end portion of the ratchet 22. The engaging portion 24 includes a first surface 24a, a second surface 24b, and a third surface 24c, all of which are aligned in sequence from the upper side to the lower side in FIG. 1. In addition, first and second inflection points 24d and 24e are defined between the first surface 24a through the third surface 24c. Furthermore, each of the first surface 24a through the third surface 24c forms a different angle, i.e., $\beta_1$, $\beta_2$, and $\beta_3$, with each parallel line 0' which runs with a reference line 0. (The reference line 0 extends between the central point of the canceling cam 13 and a neutral position 20a of the sinuous wall 20 in the detent mechanism 21.)

To be specific, the above angles are defined so as to meet a correlation of $\beta_1 > \beta_2 > \beta_3$, as illustrated in FIG. 1. Note that the angle $\beta_3$, which is defined between the third surface 24c and its parallel line 0', is directed in a negative direction relative to the reference line 0 (i.e., $\beta_3$ being less than zero).

No enlarged drawing comparable to FIG. 1 is herein provided for illustration of the engaging portion 25 which is located at a lower end portion of the ratchet 22. However, the engaging portion 25 is formed in a manner similar to the above-described engaging portion 25. The engaging portion 25 includes a first surface 25a, a second surface 25b, and a third surface 25c, all of which form a successive arrangement from the lower side to the upper side of the ratchet 22. In addition, first and second inflection points 25d and 25e are defined between the first surface 25a through the third surface 25c. Furthermore, each of the first surface 25a through the third surface 25c forms a different angle with each parallel line 0' which runs with the reference line 0.

The operation of the above structure will now be described. When a bracket 14 together with a turn lever 16 are held in a neutral position as shown in FIG. 2, engaging portions 24 and 25 of a ratchet 22 are positioned outside the range of paths in which cam-protruding portions 13a rotate. Therefore, no impact occurs between the ratchet 22 and a canceling cam 13 when the canceling cam 13 is turned in both clockwise and counterclockwise directions together with a revolving steering wheel.

Figure 3:
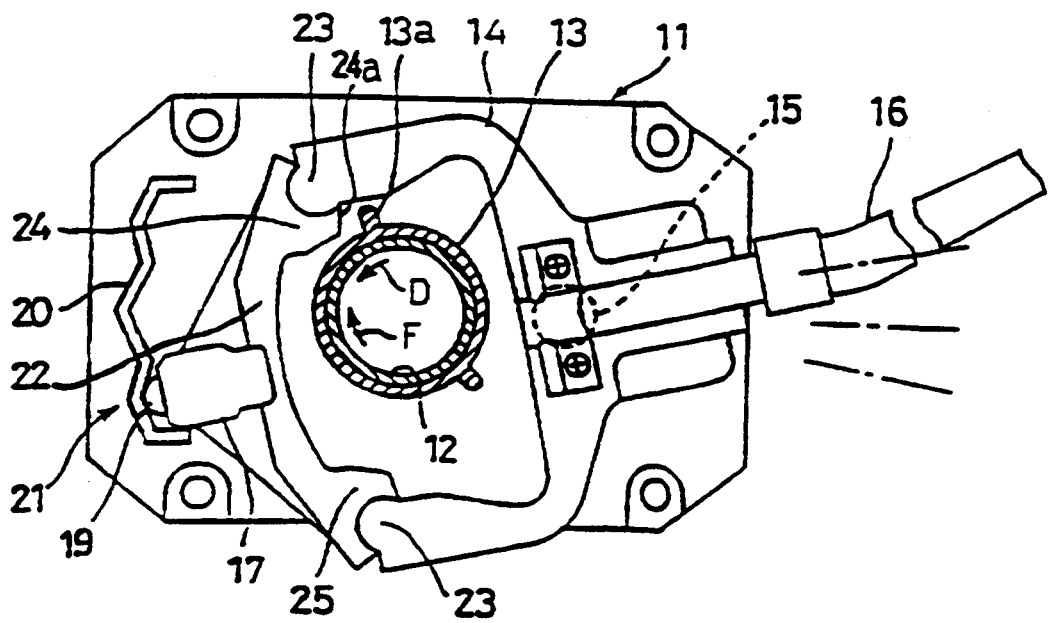
FIG. 3 is a plan view, showing the device according the first embodiment in which the bracket assumes a counterclockwise position.

When the turn lever 16 is pivoted from the neutral position to a counterclockwise position, the bracket 14 is turned to the same position in synchronism therewith, as shown in FIG. 3. This pivotal movement causes the engaging portion 24 to be positioned within a moving path of one of the cam-protruding portions 13a, the engaging portion 24 being located at the upper end portion of the ratchet 22.

Figure 4:
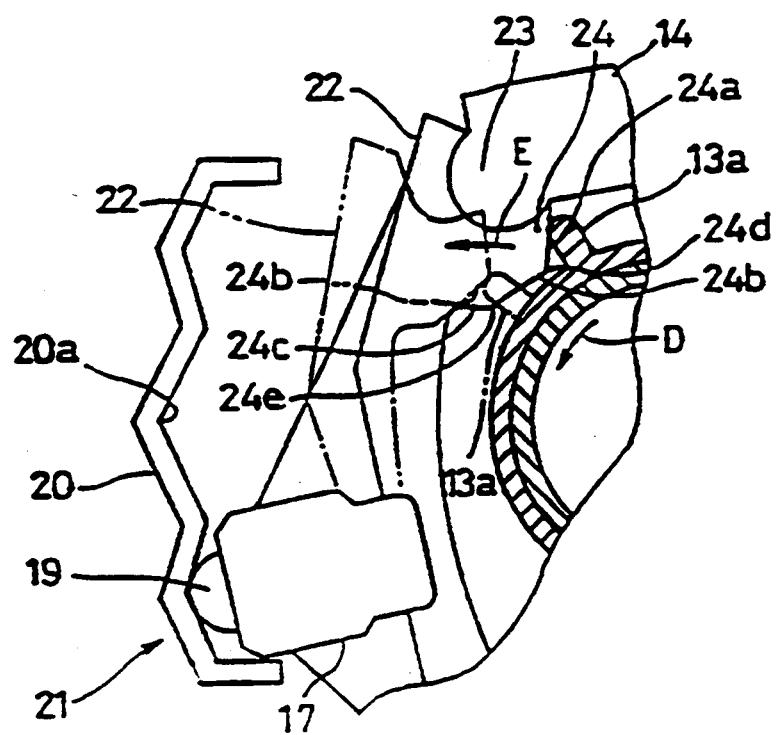
FIG. 4 is an enlarged plan view, showing the main portion of the device according the first embodiment in order to describe one operation of the first embodiment.

In the above state, the canceling cam 13 is forced into counterclockwise movement (in the direction of arrow D) in the same orientation as the turn lever 16 (that is, the canceling cam 13 assumes a non-canceling mode). The cam-protruding portion 13a then strikes against the first surface 24a of the engaging portion 24, as illustrated in FIG. 4. While shoving the first surface 24a, the cam-protruding portion 13a drives the ratchet 22 to be retracted in the direction of arrow E, which allows pivotal movement of the canceling cam 13.

When the cam-protruding portion 13a passes over a first inflection point 24d, the ratchet 22 is displaced in a direction opposite to arrow E because of the urging force of a helical compression spring 18. As depicted by an alternate long and two short dashes line in FIG. 4, the cam-protruding portion 13a thereby scrapes against second and third surfaces 24b and 24c of the engaging portion 24, while simultaneously turning in the direction of arrow D. Thereafter, the cam-protruding portion 13a is disengaged from the engaging portion 24.

Figure 5:
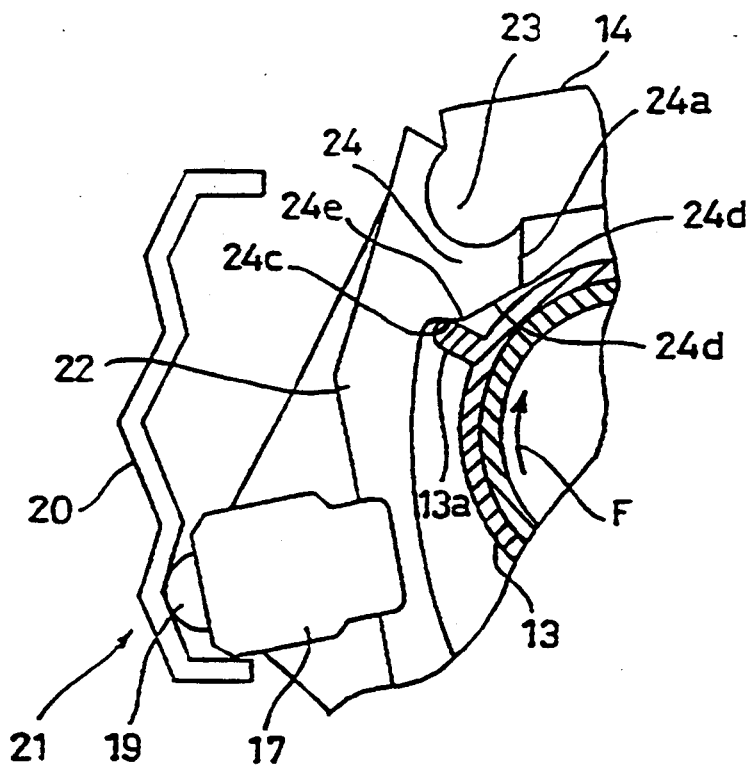
FIG. 5 is an enlarged plan view, illustrating the main portion of the device according to the first embodiment in order to describe another operation of the first embodiment.

On the other hand, as illustrated in FIG. 5, the canceling cam 13 is driven into a canceling movement (in the direction of arrow F) opposite the orientation of the bracket 14, with the bracket 14 being at the counterclockwise position shown in FIG. 3 (i.e., the canceling cam 18 assumes a canceling mode). The cam-protruding portion 18a is then forced into engagement with the third surface 24c. This engagement generates pivotal force which urges the bracket 14 back to the neutral position via the ratchet 22. The cam-protruding portion 13a is dislodged from the engaging portion 24 after permitting the ratchet 22 and the bracket 14 to be sprung back to the neutral position.

Now, the third surface 24c, with which the cam-protruding portion 13a is in engagement in the canceling mode, is particularly involved in over-cancel and cancel misoperation of canceling performance-related factors. Furthermore, the second surface 24b, against which the cam-protruding portion 13a scrapes in the non-canceling mode, is particularly associated with semi-cancel misoperation, lever vibration, and a ratchet-clicking sound of the aforesaid factors.

These relationships are summarized as follows:
1) The over-cancel is associated with the third surface 24c;
2) The cancel misoperation is related to the same 24c;
3) The semi-cancel misoperation is related to the second surface 24b;
4) The lever vibration is associated with the same 24b; and,
5) The ratchet-clicking sound is associated with the same 24b.

According to the present embodiment, the second surface 24b forms a greater degree of angle $\beta_2$, while the third surface 24c has a smaller degree of angle $\beta_3$ (with $\beta_3$ being less than zero). Accordingly, these rake angles $\beta_2$ and $\beta_3$ are in the following state with respect to the above-noted articles No. 1 through No. 5 of the canceling performance-related factors:

1) The over-cancel: the rake angle $\beta_3$ is at a relatively small degree;
2) The cancel misoperation: the rake angle $\beta_3$ is at a relatively small degree;
3) The semi-cancel misoperation: the rake angle $\beta_2$ is at a relatively large degree;
4) The lever vibration: the rake angle $\beta_2$ is at a relatively large degree; and,
5) The ratchet-clicking sound: the rake angle $\beta_2$ is at a relatively large degree.

Figures 9, 10:
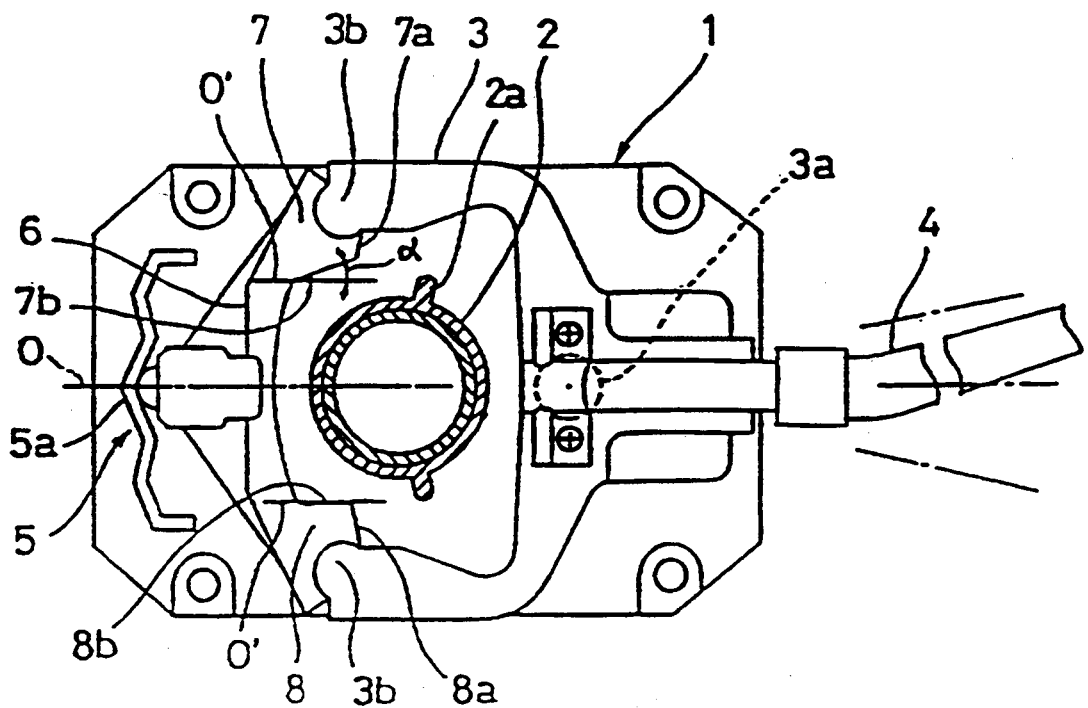
FIG. 9 is a table, indicating a relationship between a rake angle a and each canceling performance-related factor.
FIG. 10 is a plan view, illustrating a conventional direction-indicating device in which a bracket is held in a neutral position.

When evaluated and compared with a table shown in FIG. 9, the above-enumerated states of the rake angles are found to allow for optimization of the canceling performance-related factors, No. 2 through No. 5.

Although over-cancel only seems to fail judging from FIG. 9, the previously described device according to the present embodiment discloses the following.

FIG. 9 shows a correlation between varying degrees of a rake angle a and each of the canceling performance-related factors. The rake angle a is defined by an engaging surface 7b shown in FIG. 6. (FIG. 6 uses the same reference characters as in the previously described conventional structure.)

Figure 6:
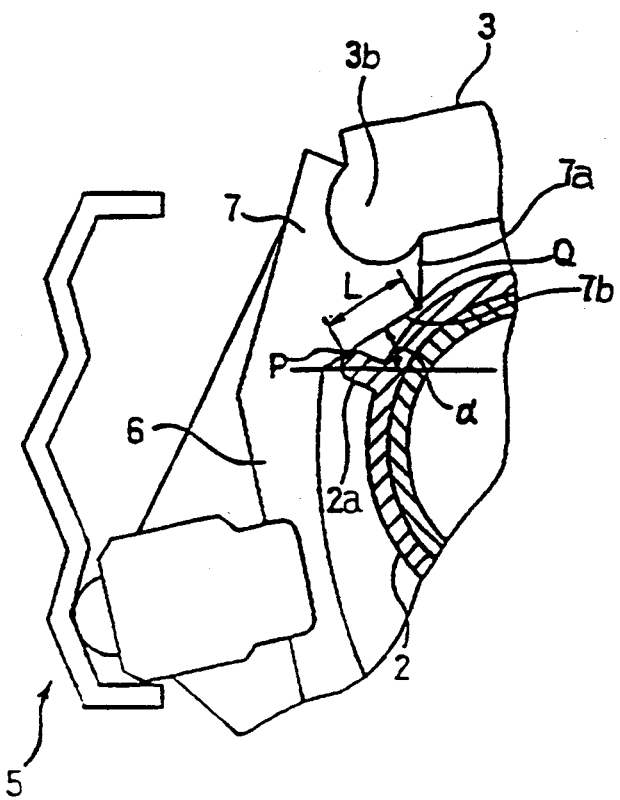
FIG. 6 is an enlarged plan view, illustrating a main portion of a conventional direction-indicating device so as to compare operation thereof with that of the first embodiment.

Assuming that the rake angle $\alpha$ remains constant, a cam-projection portion 2a shown in FIG. 6 is moved into contact with an engaging portion 7 of a ratchet 6 at an initial position P when a canceling cam 2 assumes a canceling mode. In addition, the initial position P and an inflection point Q are spaced apart from each other by a distance L. Now, as illustrated in FIG. 7, there is a relationship between the distance L and the over-cancel.

Figures 7, 8:
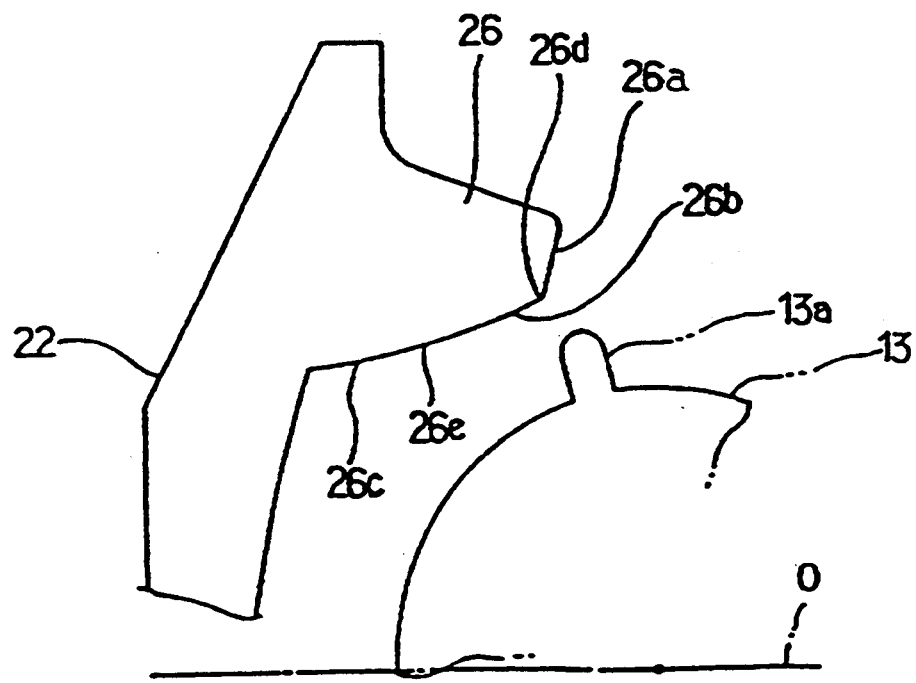
FIG. 7 is a table, indicating a relationship between a distance L and over-cancel.
FIG. 8 is an enlarged plan view, showing a main portion of a direction-indicating device according to a second embodiment.

According to FIG. 7, a possibility of the over-cancel decreases with a smaller range of the distance L (i.e., a better state), while increasing with a greater range thereof (i.e., a worse state).

According to the present embodiment shown in FIG. 5, the inflection point 24e is spaced at a sufficiently small distance from an initial position, at which the cam-protruding portion 13a is in contact with the engaging portion 24 in the canceling mode. This spacing can minimize the occurrence of over-cancel, thereby allowing for the optimization of all of the canceling performance-related factors, No. 1 through No. 5. As a result, the cancel performance-related factors can be further well-balanced so as to achieve optimization thereof, which makes it possible to completely fulfill requirements from users.

Although no illustrations are provided for a case in which the bracket 14 is held in a clockwise position, both non-canceling and canceling movement of the canceling cam 13 provide actions similar to those described previously, except for the reversal of rotation for each component. (The non-canceling and canceling movement correspond respectively to the same direction as the orientation of the bracket 14 and a direction opposite thereto.)

As an alternative to the present embodiment in which the engaging portions 24 and 25 include the first surfaces 24a and 25a through the third surfaces 24c and 25c respectively, the upper engaging portion 24 at least may be used in view of the weight of the turn lever 16 in the canceling mode. Therefore, the ratchet 22 need not necessarily be formed with the lower engaging portion 25.

Next, a second embodiment of the present invention will be described with reference to FIG. 8. Note that FIG. 8 illustrates an engaging portion 26 alone which is provided at an upper end portion of a ratchet 22.

In FIG. 8, the engaging portion 26 includes a first surface 26a, a second surface 26b, and a third surface 26c, all of which are arranged in sequence from the upper side to the lower side in the figure. In addition, a inflection point 26d is defined between the first surface 26a and the second surface 26b. Furthermore, the second surface 26b and the third surface 26c are shaped into an arcuate surface portion, of which a radius of curvature is relatively large. The arcuate surface portion extends outwardly toward the canceling cam 13. An intermediate portion 26e, which is interposed between the second surface 26b and the third surface 26c, corresponds to an inflection point 24e according to the first embodiment.

As a result, the above structure presents a similarity to the previously described embodiment. That is, each of the first surface 26a through the third surface 26c forms a different angle with a reference line 0. Accordingly, the present embodiment offers operation and benefits similar to the first embodiment.

What is claimed is:

1. A direction-indicating device for a vehicle, comprising:
    a base;
    a canceling cam, which rotates together with a steering wheel, said canceling cam having a cam-protruding portion defined on an outer-circumferential portion thereof;
    a bracket pivotably disposed on said base so as to surround said canceling cam;
    a turn lever located at one side of said bracket in order to pivot said bracket between a counterclockwise position, a clockwise position, and a neutral position;
    a ratchet having two end portions, said ratchet being positioned at another side of said bracket around said canceling cam so as to be supported by said bracket at both said end portions of said ratchet, said ratchet having engaging portions defined adjacent both of said end portions of said ratchet so as to move together with pivotal movement of said bracket toward one of said clockwise and counterclockwise positions, one of said engaging portions being driven within a locus of movement of said cam-protruding portion in response to positioning of said bracket, said ratchet being urged in a direction at which said turn lever is positioned; and,
    a detent mechanism mounted to both of said bracket and said base so as to permit said bracket to be selectively held between said clockwise and counterclockwise positions and said neutral position,
    wherein at least one of said engaging portions defined on said ratchet includes:
    a first surface thrust by said cam-protruding portion when said bracket remains pivoted to one of said clockwise and counterclockwise positions, and further said canceling cam is turned in the same direction as said bracket;
    a second surface, against which said cam-protruding portion scrapes when said cam-protruding portion is further moved in said direction of said bracket after passing over said first surface upon movement of said ratchet due to thrusting of said cam-protruding portion at said first surface; and,
    a third surface, with which said cam-protruding portion is moved into engagement when said bracket remains pivoted to one of said clockwise and counterclockwise positions while said canceling cam is turned in a direction opposite to the orientation of said bracket, said bracket being pivoted to said neutral position because of engagement between said cam-protruding portion and said third surface, each of said first surface, said second surface, and said third surface forming a different angle with a reference line extending between a central point of said canceling cam and said neutral position of said detent mechanism.

2. A direction-indicating device for a vehicle according to claim 1, wherein said angles defined between each of said first surface, said second surface and said third surface and said reference line correspond to a first angle $\beta_1$, a second angle $\beta_2$ and a third angle $\beta_3$, respectively, said angles satisfying the equation $\beta_1 > \beta_2 > \beta_3$.

3. A direction-indicating device for a vehicle according to claim 2, wherein said third angle formed in relation to said reference line is directed in a direction opposite to orientations in which said first and second angles are defined relative to said reference line.

4. A direction-indicating device for a vehicle according to claim 1, wherein said bracket has a C-shaped configuration.

5. A direction-indicating device for a vehicle according to claim 4, wherein both of said end portions of said ratchet are supported to a pair of supporting portions of said bracket.

6. A direction-indicating device for a vehicle according to claim 1, wherein said bracket is integrally formed of a resin.

7. A direction-indicating device for use in a vehicle according to claim 1, wherein said detent mechanism has a sinuous wall provided on said base and has an urging means provided on said bracket, said sinuous wall being defined with a plurality of recess portions so as to form a zig-zag pattern when viewed from the top of said sinuous wall, and wherein said urging means is forced against one of said plurality of recess portions so as to allow said bracket to be held in one of said counterclockwise position, said clockwise position, and said neutral position.

8. A direction-indicating device for a vehicle according to claim 7, wherein said urging means includes a helical compression spring and a sinuous wall-abutting piece, said sinuous wall-abutting piece being forced against said sinuous wall because of urging force of said helical compression spring.

9. A direction-indicating device for a vehicle according to claim 1, wherein said base is formed of a resin.

10. A direction-indicating device for a vehicle, comprising:
a base;
a canceling cam, which rotates together with a steering wheel, said canceling cam having a cam-protruding portion defined on an outer-circumferential portion thereof;
a bracket pivotably disposed on said base so as to surround said canceling cam;
a turn lever located at one side of said bracket in order to pivot said bracket between a counterclockwise position, a clockwise position, and a neutral position;
a ratchet having two end portions, said ratchet being positioned at another side of said bracket around said canceling cam so as to be supported by said bracket at both said end portions of said ratchet, said ratchet having engaging portions defined adjacent both of said end portions of said ratchet so as to move together with pivotal movement of said bracket toward one of said clockwise and counterclockwise positions, one of said engaging portions being driven within a locus of movement of said cam-protruding portion in response to positioning of said bracket, said ratchet being urged in a direction at which said turn lever is positioned; and,
a detent mechanism mounted to both of said bracket and said base so as to permit said bracket to be selectively held between said clockwise and counterclockwise positions and said neutral position,
wherein at least one of said engaging portions defined on said ratchet includes:
a first surface thrust by said cam-protruding portion when said bracket remains pivoted to one of said clockwise and counterclockwise positions, and further said canceling cam is turned in the same direction as said bracket;
a second surface, against which said cam-protruding portion scrapes when said cam-protruding portion is further moved in said direction of said bracket after passing over said first surface upon movement of said ratchet due to thrusting of said cam-protruding portion at said first surface; and,
a third surface, with which said cam-protruding portion is moved into engagement when said bracket remains pivoted to one of said clockwise and counterclockwise positions while said canceling cam is turned in a direction opposite to the orientation of said bracket, said bracket being pivoted to said neutral position because of engagement between said cam-protruding portion and said third surface,
said second surface and said third surface being formed into an arcuate surface portion which protrudes toward said canceling cam, said second surface and said third surface being separated by an inflection point, and a reference line extends between a central point of said canceling cam and said neutral position of said detent mechanism.

11. A direction-indicating device for a vehicle according to claim 10, wherein angles defined between each of said first surface, said second surface and said third surface and said reference line correspond to a first angle $\beta_1$, a second angle $\beta_2$ and a third angle $\beta_3$, respectively, said angles satisfying the equation $\beta_1 > \beta_2 > \beta_3$.

12. A direction-indicating device for a vehicle according to claim 11, wherein said third angle formed in relation to said reference line is directed in a direction opposite to orientations in which said first and second angles are defined relative to said reference line.

13. A direction-indicating device for a vehicle according to claim 10, wherein said bracket has a C-shaped configuration.

14. A direction-indicating device for a vehicle according to claim 13, wherein both of said end portions of said ratchet are supported to a pair of supporting portions of said bracket.

15. A direction-indicating device for a vehicle according to claim 10, wherein said bracket is integrally formed of a resin.

16. A direction-indicating device for use in a vehicle according to claim 10, wherein said detent mechanism has a sinuous wall provided on said base and has an urging means provided on said bracket, said sinuous wall being defined with a plurality of recess portions so as to form a zig-zag pattern when viewed from the top of said sinuous wall, and wherein said urging means is forced against one of said plurality of recess portions so as to allow said bracket to be held in one of said counterclockwise position, said clockwise position, and said neutral position.

17. A direction-indicating device for a vehicle according to claim 16, wherein said urging means includes a helical compression spring and a sinuous wall-abutting piece, said sinuous wall-abutting piece being forced against said sinuous wall because of urging force of said helical compression spring.

18. A direction-indicating device for a vehicle according to claim 10, wherein said base is formed of a resin.

19. The direction-indicating device of claim 1, wherein an inflection point is formed at an intersection of said second surface and said third surface, an initial position on said third surface is defined where said cam-protruding portion engages said third surface, and a distance from said initial position to said inflection point is sufficiently small to minimize over-cancel.

20. The direction-indicating device of claim 10, wherein an initial position on said third surface is defined where said cam-protruding portion engages said third surface, and a distance from said initial position to said inflection point is sufficiently small to minimize over-cancel.

* * * * *